United States Patent [19]
Springsits

[11] 3,921,935
[45] Nov. 25, 1975

[54] RIBBON RECORDING APPARATUS

[76] Inventor: Johann Heinrich Springsits, 206 Dukes Court, 184 Beatrix St., Arcadia, Pretoria 0002, South Africa

[22] Filed: Jan. 31, 1974

[21] Appl. No.: 438,219

[30] Foreign Application Priority Data
Feb. 7, 1973 South Africa.................... 73/0850

[52] U.S. Cl................. 242/194; 352/156
[51] Int. Cl.²............ G03B 1/04; G11B 15/32
[58] Field of Search........ 242/194, 193, 71.2, 68.3; 352/72, 78, 156

[56] References Cited
UNITED STATES PATENTS

| | | | |
|---|---|---|---|
| 2,476,705 | 7/1949 | Coutant et al. | 352/156 |
| 3,263,936 | 8/1966 | Williams | 242/194 |
| 3,499,617 | 3/1970 | Winkler | 242/194 |
| 3,539,130 | 10/1970 | Winkler et al. | 242/194 |
| 3,672,603 | 6/1972 | Swain | 242/194 |
| 3,677,494 | 7/1972 | Protas | 242/194 |

FOREIGN PATENTS OR APPLICATIONS
1,245,724  7/1967  Germany.................. 352/72

*Primary Examiner*—Leonard D. Christian
*Attorney, Agent, or Firm*—Fred Wiviott

[57] ABSTRACT

A cassette, particularly for use in cine cameras for containing a ribbon on which information can be recorded. The ribbon is provided on a wind-off spool in an unrecorded state inside the cassette, it passes over an information recording region and is wound on to a wind-on spool. The wind-on spool is adjacent the wind-off spool with its axis of rotation coincident with a projection of an axis of rotation of the wind-off spool. The wind-off spool and the wind-on spool both have formations accessible through apertures in the cassette, adapted to provide both a forward wind and a rewind facility. The wind-off spool and ribbon can be located inside a light sealed cartridge removably placed in the cassette. The cassette can have lids to facilitate loading and unloading of the ribbon and cartridge. Special formations can permit both the wind-on and wind-off spools to be driven from the same aperture in the cassette. The invention is an improvement of a widely used commercial super 8 mm cine cassette and camera.

4 Claims, 14 Drawing Figures

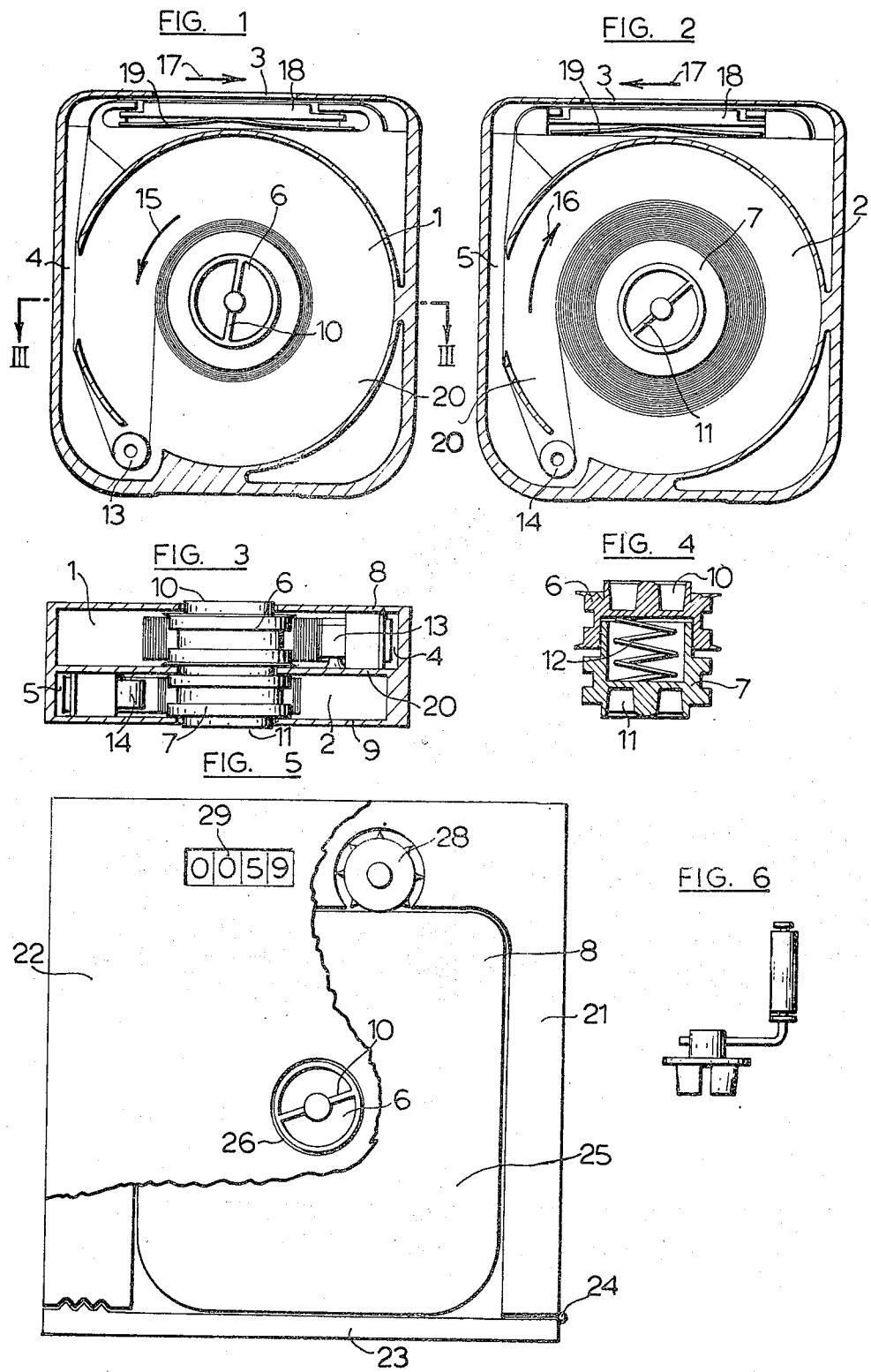

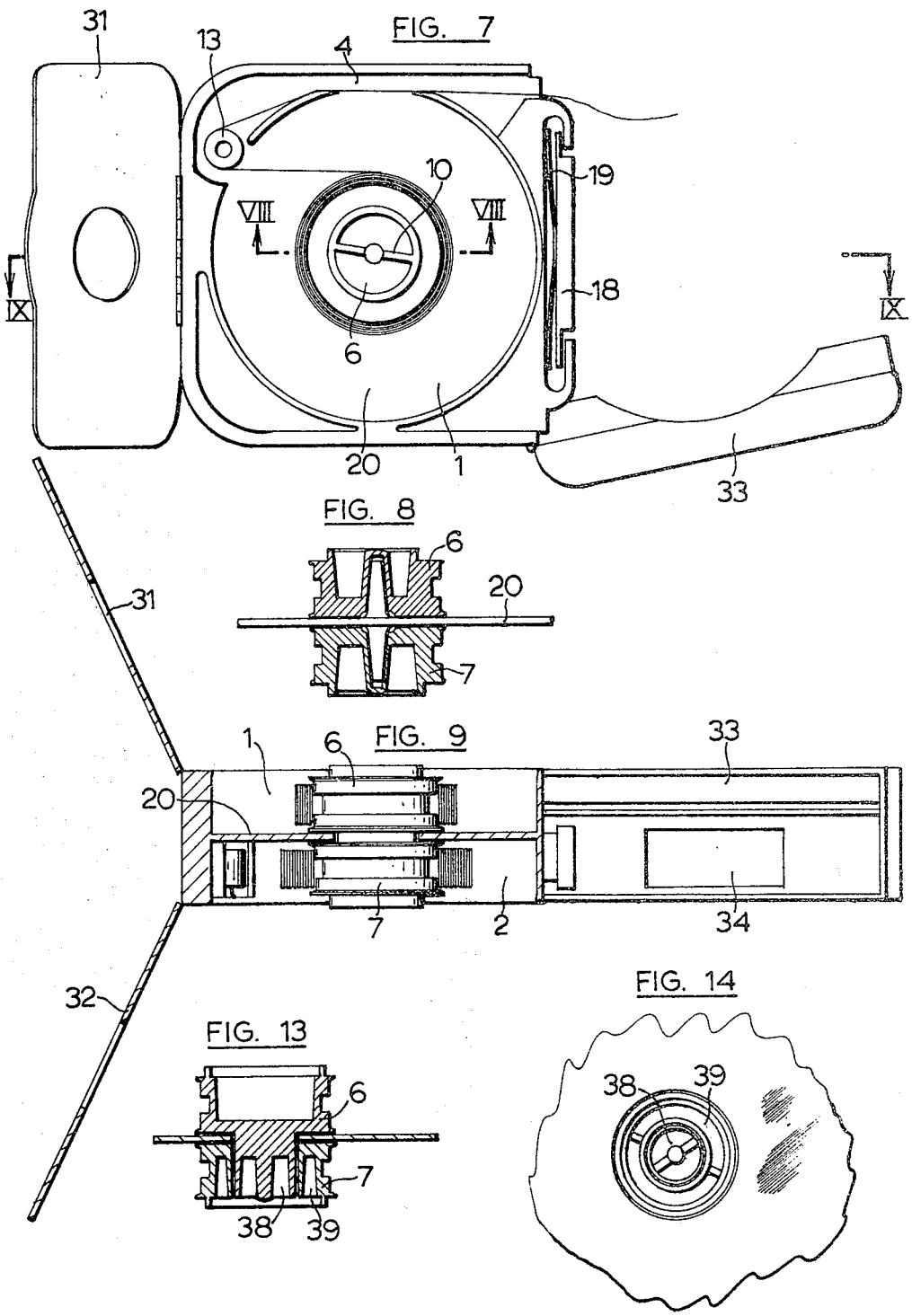

RIBBON RECORDING APPARATUS

BACKGROUND OF THE INVENTION

This invention concerns improvements relating to ribbon recording apparatus by which is meant apparatus adapted for recording information on ribbon-like materials such, for example, as tape recorders for recording audio and visual information on magnetic tapes and cinematographic apparatus for recording pictures on photo sensitized films in ribbon form. In particular this invention relates to such apparatus in the context of cassette containers for the rolls of the ribbon, the cassette being adapted for the ribbon to be unwound and rewound on at positions which are axially separated on the same axis of rotation, the information being recorded on the ribbon at a stage intermediate of the unwinding and rewinding.

Thus the cassette is of the kind where the ribbon is wound on a roll in the cassette in an unrecorded condition, the leading end of the ribbon passes across an information recording region and proceeds to a wind-on spool in the cassette. The ribbon with the information recorded on it will be wound up on the spool. The characteristic of the cassettes with which this invention is concerned is that the axis of rotation of the wind-on spool on which the ribbon is wound up if projected is coincident with the axis of the roll of the ribbon from which the ribbon is taken off while information is being recorded on the ribbon. This type of cassette is known in the context of cine cameras but suffers the significant disadvantage for users that cassettes to date have not been provided with a rewind facility which is adapted to permit rewinding the ribbon at any stage of unwinding of its length by means of which double exposure, or, in a general context, double recording of the ribbon can be effected.

SUMMARY OF THE INVENTION

A cassette in accordance with this invention for a ribbon on which information is to be recorded comprises a two chambered case, a first chamber being adapted to contain and permit the working of a wind-off spool and a second chamber being adapted to contain and permit independent working of a wind-on spool, a region for recording of information on to a ribbon, a lead-off passage from the first chamber to the region for recording information, a lead-on passage from the region for recording information to the second chamber, friction reducing formations being provided in the aforesaid passage and the recording region, a wind-off spool and a wind-on spool coaxially rotatively mounted in the first and second chambers respectively, two holes in the casing walls, one hole for the wind-off spool and one hole for the wind-on spool so that a formation on each spool for separately rotatively driving each spool is accessible through each hole.

Of course if the cassette is for a photo sensitive material for use in a cine camera the cassette must be made light sealed so that the film is protected from light apart from a window provided in the cassette at the recording region.

Preferably both the spools are provided with light frictional restraint means adapted to prevent return rotating of either spool under spring action of the ribbon itself.

Preferably both the lead-off and lead-on passages are provided with a freely rotatable roller at a position of maximum flexing of the ribbon for frictional reduction purposes.

For example certain cine cameras do not have a rewind facility built in and in such cases it may be possible to provide an accessory or modification parts. In fact in many cases for example such as a super-8 cine camera it will be possible to modify the camera by suitable accessories for a rewind facility.

An alternative procedure is to provide a separate rewinding apparatus in which case the cassette would be removed from the standard apparatus and installed into the rewinding apparatus so that it can be rewound.

On the one hand the cassette can be permanently sealed. In the case of a cine film the cassette will be broken open to permit processing the ribbon film, the cassette thereby being destroyed. On the other hand the cassette can be given lids to permit loading and unloading the ribbon into and out of the cassette. The wind-off spool can be located inside a light sealed cartridge with the ribbon inside the cartridge on the spool, and leading out of a light sealed slit in the cartridge, for light exposed films, especially cine films. (A cartridge could of course, if desired, be used for other ribbon recording material).

BRIEF DESCRIPTION OF THE DRAWINGS

This invention will be further described by way of examples with reference to the accompanying drawings in which:

FIGS. 1, 2, 3 and 4 show a cassette in accordance with a first species of this invention;

FIG. 1 being a plan view with the top cover removed;

FIG. 2 being an underneath view with the bottom cover removed;

FIG. 3 being a sectional elevation on section III—III of FIG. 1, and

FIG. 4 being a sectional elevation on the same scale of certain components of the cassette;

FIGS. 5 and 6 show a rewinding apparatus,

FIG. 5 being a plan view with a top cover partly broken away, and

FIG. 6 showing a handle for the rewinding apparatus;

FIGS. 7, 8 and 9 show a cassette in accordance with a second species of this invention, FIG. 7 being a plan view, FIG. 8 a detail on section VIII—VIII, and FIG. 9 an elevation on section IX—IX;

FIGS. 13 and 14 show wind-on and wind-off spools having special formations,

FIG. 13 being an elevation on an axial section, and

FIG. 14 is a plan view.

DESCRIPTION OF THE PREFERRED EMBODIMENT

Figure 10:
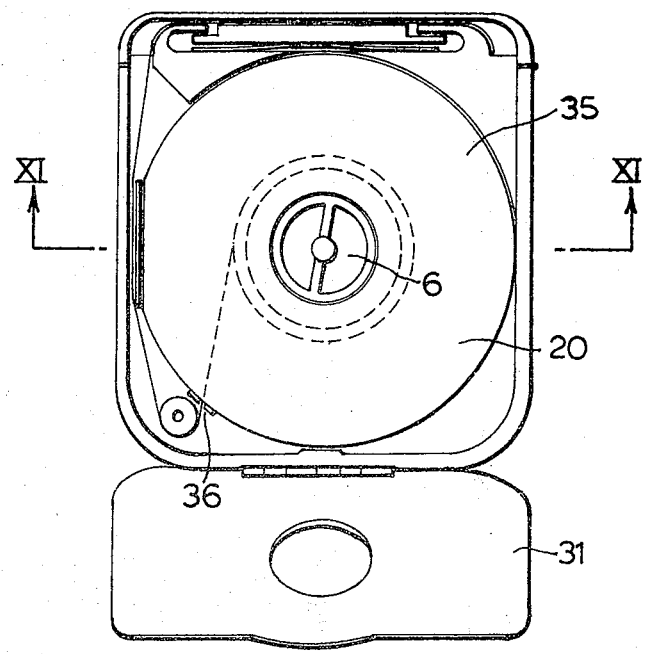
FIGS. 10, 11 and 12 show a cassette in accordance with a third species of this invention, FIG. 10 being a plan view, FIG. 11 an elevation on section XI—XI, and FIG. 12 a similar view of a modified form.

As shown in FIGS. 1 to 4 the cassette comprises two chambers, namely a first chamber 1 for winding ribbon off a spool and a second chamber 2 for winding ribbon onto a spool, a region 3 for receiving information and recording it on to the ribbon, a lead-off passage 4 for leading ribbon from the chamber 1 to the region 3 and a lead-on passage 5 for leading ribbon from the region 3 to the chamber 2, two spools 6 and 7 rotatively and coaxially mounted, 6 being the wind-off spool and 7 the wind-on spool.

In view of FIGS. 1 and 2 the covers 8 and 9 are removed to reveal the interior of the chambers 1 and 2, but the covers 8 and 9 as shown in FIG. 3 each have round apertures through which cranking connection formations 10 and 11 of the spools 6 and 7 respectively project. As shown in FIG. 4 the spools 6 and 7 are hollowed and are telescopically connected to each other also free to rotate relative to each other with a light compression spring 12 located in the hollowed out space between the two spools. The function of the light coil spring 12 is thus to gently press the two spools apart from each other and this in turn in the assembled state results in them gently pressing against the covers 8 and 9, causing a low frictional resistance against the rotation. The purpose of this is to prevent the spools from unwinding due to a spring action of freshly wound up ribbon so that the ribbon remains neatly and tightly coiled. Two rollers 13 and 14 are located at positions where the ribbons bend reentrantly into the passages 4 and 5 respectively. The rollers reduce the friction which would otherwise occur at these positions. The arrows 15 and 16 show the directions of rotation of the spools 6 and 7 respectively during winding of the ribbon in a normal direction as indicated also in the region 3 by the arrow 17. On rewinding the direction is of course the opposite. The normal locking bar 18 which is loaded by spring 19 is located in the region 3. In this embodiment the chambers 1 and 2 are separated by a wall 20 but it should be noted that this is not functionally essential and thus this type of separation may be partially omitted. The term "two chambers" used above must be interpreted with this in mind.

As shown in FIGS. 5 and 6 a separate rewind mechanism comprises a yoke 21 having covers 22 on both sides and a lid 23 which is openable on a hinge 24. The rewind mechanism is shown with a cassette 25 in accordance with this invention enclosed in position inside the mechanism. The lid 22 has a hole 26 for access to winding formation 6 of the cassette 25. The formation 6 is part of a spool which takes up the ribbon on rewinding of the ribbon that is the spool which normally is the take-off spool in normal operation. The mechanism further comprises a toothed sprocket 28 which is adapted to run in holes provided on the side of the ribbon as for example in the case of a cine film. The sprocket 28 is suitably gear connected to a counter mechanism 29 which can be used to give an exact indication of the position of the ribbon. A winding handle as shown in FIG. 6 may be employed to wind the sprocket which presents its formation 6 for the purpose of rewinding the ribbon.

It may be mentioned that in all the figures of the illustration the mechanism can be adapted for being light proof so that it can be used for cine film.

As a more convenient adaptation a cine camera for example which normally does not have a rewind facility can be adapted for rewinding by providing the following accessory or modification components:
a. a rewind mechanism either manual or motor driven;
b. a means to withdraw the film advancing claw in a film exposure region of the camera during rewinding;
c. a frame counter.

A camera adapted in this manner and which is adapted for a cassette in accordance with this invention is included within the scope of this invention.

As shown in FIGS. 7, 8 and 9 the cassette can be provided with a lid 31 to expose or close the chamber 1, a lid 32 to expose or close the chamber 2 and a lid 33 having a window 34 covering the information recording region 3. With all these lids open an empty cassette can be loaded with a recording ribbon, and the lids then closed for use. For use with light sensitive film at least the roll of film must be loaded on to the wind-off spool 6 in a dark room and that lid 31 closed in the dark room. This assumes that the lead-off passage 4 is light proof, e.g. by means of a felt-lined slit (not shown) from the recording region 3 to the first chamber 1 containing the wind-off spool 6 and unexposed film. Then the leading end of the film ribbon can be led over the recording region 3, after which lid 33 can be closed, and on to the wind-on spool 7 via the lead-on passage after which that lid 32 can be closed.

Figure 11:
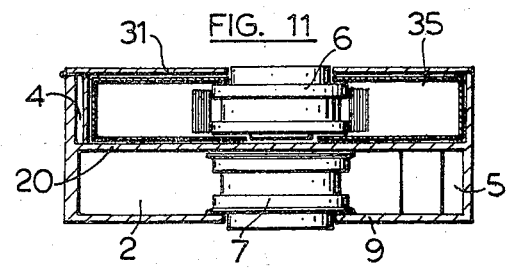

As shown in FIGS. 10 and 11, especially for light sensitive film this system can be modified. The wind-off spool 6 and unexposed film wound on it can be enclosed inside a light sealed cartridge 35. The ribbon passes out of the cartridge via a light sealed slit 36, and thence is placed as described above. The cartridge fits into the cassette as shown. The dividing wall 20 present in previous drawings can be omitted in this case. A fully exposed film can be rewound back into the cartridge which can then be extracted and forwarded for processing the film.

Figure 12:
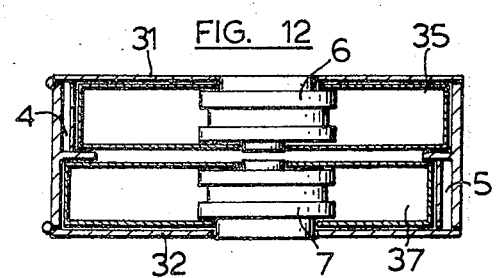

In FIG. 12 the cartridge idea is shown extended to having two cartridges 35 and 37. The film winds off the spool 6 in the cartridge 35 and winds on to the spool 7 in the cartridge 37. The exposed film inside the cartridge 37 can then be forwarded for processing and the exhausted spool 35 changed over to the chamber 2 to serve for the next film. The cartridges can then be recycled from the processing factory.

FIGS. 13 and 14 show a modification to the spools. These spools 6 and 7 have special formations to permit winding both from the same side. Spool 6 has a formation 38 located in a bore of the spool 7. The spool 7 has a formation 39 of toroidal shape surrounding the formation 38. This type of spool arrangement can be applied in any of the preceding cassettes, when naturally one hole only in the cassette wall will be used for access to the formations from outside, and the other hole closed over.

What is claimed is:

1. A cassette for a light sensitive ribbon on which information is to be recorded which comprises a casing having one and another chambers, a wind-off spool and a wind-on spool, one chamber being for containing a wind-off spool and the other chamber being for containing a wind-on spool, said casing having a region for recording information onto ribbon, means forming a passage from said one chamber to the region for recording information, means forming a passage from the region for recording information to said another chamber, friction reducing means for supporting ribbon in the aforesaid passages and the recording region, a wind-off spool for ribbon and a wind-on spool for receiving ribbon from said wind-off spool, said spools being coaxially rotatively mounted in said one and another chambers respectively, said casing having at least one hole for providing access to each spool for separately rotatively driving each spool, a lid having a window covering the recording region, the lid being removably mounted on said casing, the window in the lid being for exposing a portion of said ribbon for information to be recorded thereon and to be retrieved therefrom while the lid is closed, and means in said casing for shielding said passages and chambers against light transmission from the recording region.

2. A cassette according to claim 1 including a light sealed cartridge for containing said wind-off spool and ribbon wound thereon, said cartridge being removably located in said one chamber of said casing, a removably mounted lid on said one chamber, said cartridge having a light sealed slit through which the ribbon exits from the cartridge.

3. A cassette according to claim 2 including a second light sealed cartridge in which said take-up spool is rotatably mounted, said second cartridge being removably located in said another chamber, said another chamber also having a removably mounted lid, said second cartridge having a light sealed slit through which said ribbon enters for being taken up by said take-up spool.

4. A cassette according to claim 1, in which said first spool has cylindrical means extending axially therefrom and said second spool has an axialbore in which said cylindrical means is coaxially disposed, and means on each of said cylindrical means of said first spool and said second spool adapted for being engaged to effect selective relative rotation of said spools, said casing having one opening for access to engage said spools.

* * * * *

UNITED STATES PATENT OFFICE
CERTIFICATE OF CORRECTION

Patent No. 3,921,935                    Dated November 25, 1975

Inventor(s) Johann Heinrich Springsits

It is certified that error appears in the above-identified patent and that said Letters Patent are hereby corrected as shown below:

Claim 3, Column 5, line 14, cancel "take-up" and substitute --wind-on--; Column 6, line 5, cancel "take-up" and substitute --wind-on--.

Claim 4, Column 6, line 8, cancel "axialbore" and substitute --axial bore--.

Signed and Sealed this eleventh Day of May 1976

[SEAL]

Attest:

RUTH C. MASON
Attesting Officer

C. MARSHALL DANN
Commissioner of Patents and Trademarks